(12) United States Patent
Watanabe

(10) Patent No.: US 11,951,754 B2
(45) Date of Patent: Apr. 9, 2024

(54) PRINTER AND METHOD

(71) Applicant: TOSHIBA TEC KABUSHIKI KAISHA, Tokyo (JP)

(72) Inventor: Noriyuki Watanabe, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 65 days.

(21) Appl. No.: 17/719,853

(22) Filed: Apr. 13, 2022

(65) Prior Publication Data

US 2023/0020343 A1 Jan. 19, 2023

(30) Foreign Application Priority Data

Jul. 14, 2021 (JP) .................................. 2021-116467

(51) Int. Cl.
*B41J 2/35* (2006.01)
*B41J 11/04* (2006.01)
*B41J 11/44* (2006.01)

(52) U.S. Cl.
CPC ................. *B41J 2/35* (2013.01); *B41J 11/04* (2013.01); *B41J 11/44* (2013.01)

(58) Field of Classification Search
CPC ..... B41J 2/35; B41J 2/355; B41J 11/04; B41J 11/44; B41J 2/325; B41J 2/32; B41J 2/365; B41J 2/375; B41J 29/38; B41J 29/393; Y02D 10/00
See application file for complete search history.

(56) References Cited

FOREIGN PATENT DOCUMENTS

| JP | 2006212826 A | 8/2006 |
|---|---|---|
| KR | 20070001370 A | 1/2007 |

OTHER PUBLICATIONS

Extended European Search Report dated Nov. 24, 2022, mailed in counterpart European Application No. 1 22179186.6, 9 pages.

*Primary Examiner* — Kristal Feggins
(74) *Attorney, Agent, or Firm* — Kim & Stewart LLP

(57) ABSTRACT

A printer in one example includes a thermal printhead with resistive heating elements. A motor is provided in the printer for conveying paper to the thermal printhead. A power supply is provided to supply power to the thermal printhead and the motor. A processor is configured to cause the supply of power to the motor to be paused after the supply of power to the thermal printhead exceeds a power threshold value and then to resume the supply of power to the motor after a predetermined period of time elapses after the pause of the supply of power to the motor.

20 Claims, 6 Drawing Sheets

PRINTER AND METHOD

CROSS-REFERENCE TO RELATED APPLICATION

This application is based upon and claims the benefit of priority from Japanese Patent Application No. 2021-116467, filed on Jul. 14, 2021, the entire contents of which are incorporated herein by reference.

FIELD

Embodiments described herein relate generally to a printer and a method of printing information with a printer.

BACKGROUND

According to the related art, a thermal printer that prints with a thermal head is known. Such a printer consumes a large amount of electric power in causing a resistor provided in the thermal head to generate heat for printing as well as in driving a motor that rotates a platen roller conveying the paper being printed.

Some printers have power supplies such as an AC adaptor that has a built-in protection circuit. The protection circuit temporarily stops feeding power to avoid a malfunction due to overload if a predetermined phenomenon has occurred. However, if the power fed to the printer is unexpectedly stopped momentarily, this adversely affects printing control and printing accuracy, which is not preferable.

DETAILED DESCRIPTION

An embodiment described herein is to provide a printer and method that can avoid a temporary stop of power feeding due to the functions of a power supply and thus can continue smooth printing control and maintain high printing accuracy.

In general, according to one embodiment, a printer includes a thermal printhead with resistive heating elements. A motor is provided for conveying paper to the thermal printhead. A power supply is configured to supply power to the thermal printhead and the motor. A processor is configured to cause the supply of power to the motor to be paused after the supply of power to the thermal printhead exceeds a power threshold value and then to resume the supply of power to the motor after a predetermined period of time elapses after the pause of the supply of power to the motor.

First Embodiment

Figure 1:
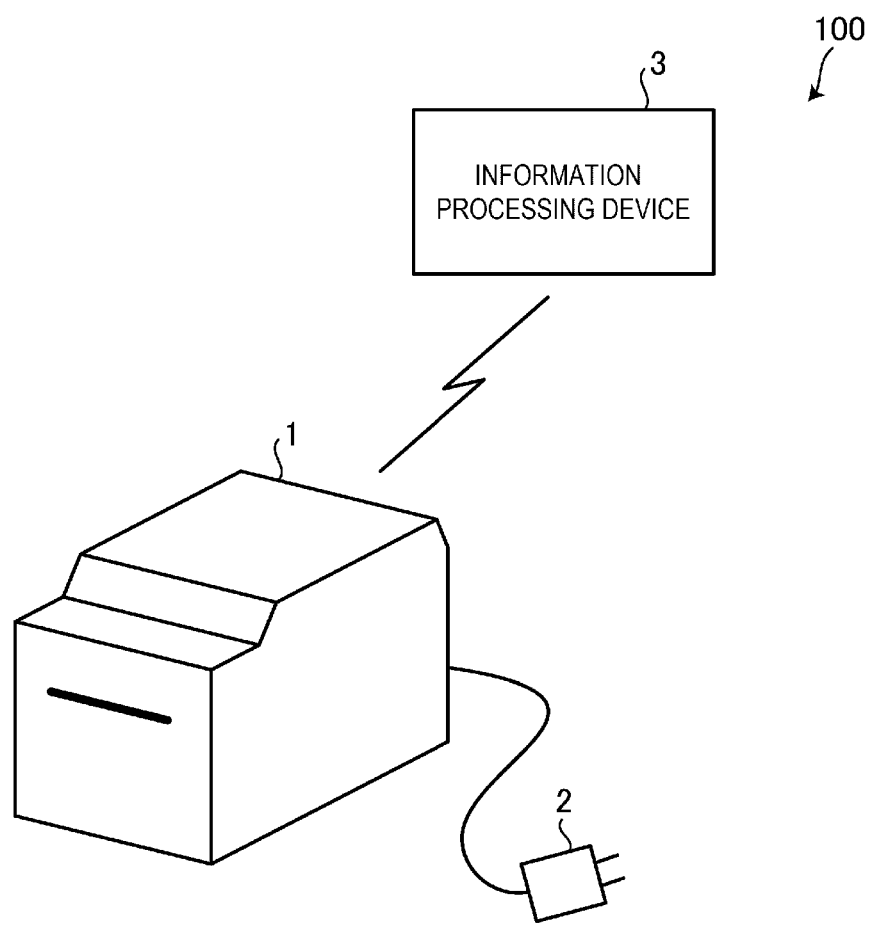
FIG. 1 explains the configuration of a system according to an embodiment.

FIG. 1 explains the configuration of a system 100 according to an example embodiment. The system 100 includes a printer 1, an AC adaptor 2, and an information processing device 3. The printer 1 operates with power supplied via the AC adaptor 2, executes printing based on printing data received from the information processing device 3, and discharges the printed paper. The information processing device 3 is, for example, a general-purpose PC (personal computer) and is connected to the printer 1 in such a way as to be able to transmit and receive information via wireless or wired communication.

Figure 2:
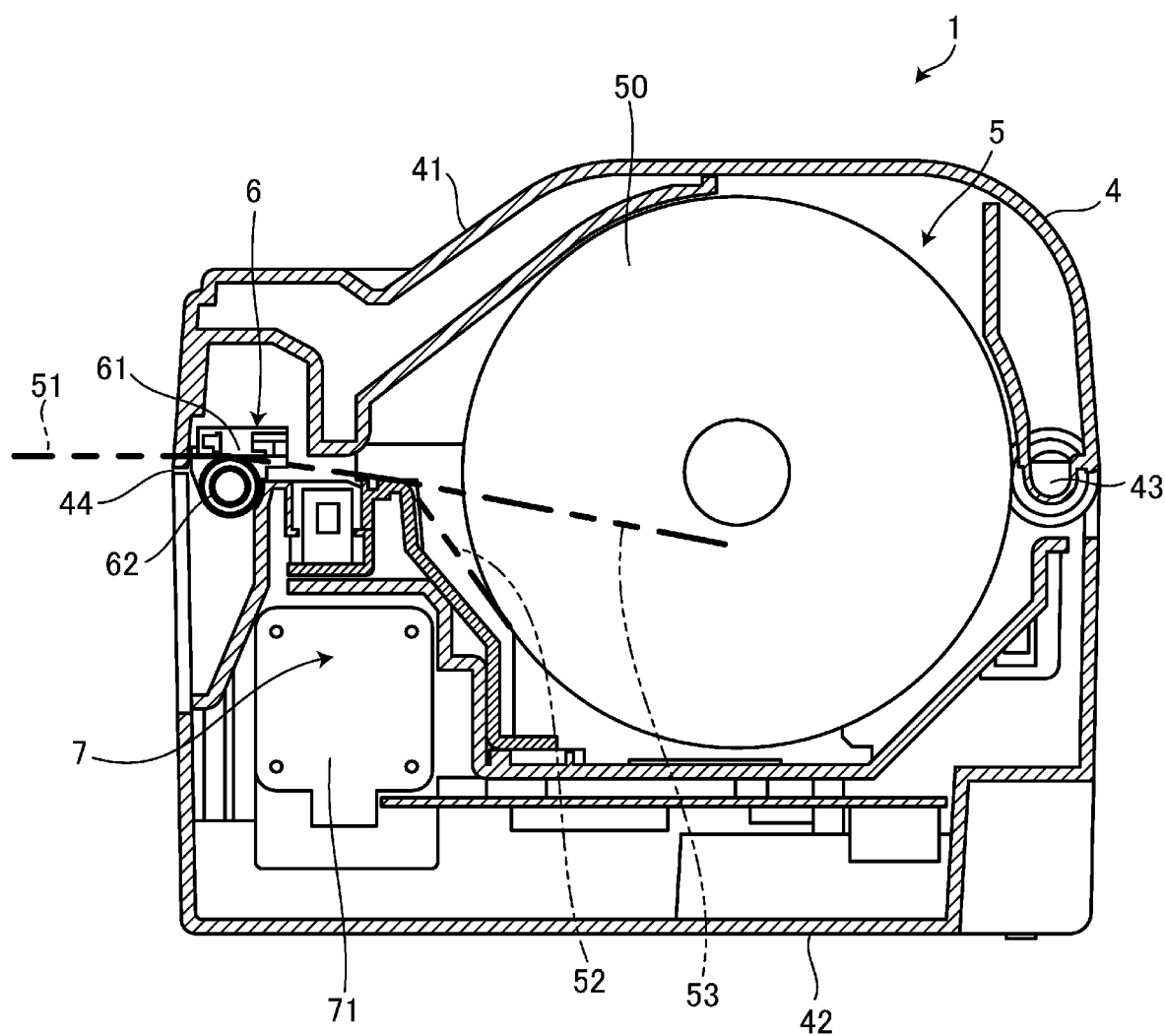
FIG. 2 is a cross-sectional view explaining an example of a structure of a printer.

FIG. 2 is a cross-sectional view explaining an example of the structure of the printer 1. In the illustration, the left side in the drawing corresponds to the front of the printer 1, that is, the side that the user mainly faces when operating or controlling the printer. The printer 1 has a casing 4, a paper container unit 5, a printing unit 6, and a conveyor unit 7.

The casing 4 has an upper module 41, a lower module 42, a hinge part 43, and a paper discharge port 44. The hinge part 43 couples back end parts of the upper module 41 and the lower module 42 together in a rotationally movable manner in relation to each other. The lower module 42 has an opening that is open upward. This opening can be opened and closed by movement of the upper module 41 up and down (rotation about hinge part 43). That is, the upper module 41 functions as a lid of the lower module 42. The paper discharge port 44 is an opening formed between a front end part of the upper module 41 and a front end part of the lower module 42. A printed paper 50 is discharged via the paper discharge port 44.

The paper container unit 5 is a space provided inside the casing 4 and containing the paper 50. The paper container unit 5 is opened and closed by rotationally moving the upper module 41 in relation to the lower module 42. The paper 50 is rolled into a roll-like shape (a paper roll).

In the illustration, dashed lines indicate conveyance paths 51, 52, 53. The conveyance path 52 is a path where the paper 50 travels toward the printing unit 6 when the paper roll (paper 50) is at its a maximum diameter moves (e.g., a fresh or unused paper roll has been installed). The conveyance path 53 is a path where the paper 50 travels toward the printing unit 6 when the paper roll (paper 50) is at its minimum diameter moves (e.g., the paper roll is about exhausted). The conveyance path 51 is a path where the paper 50 travels after being printed by the printing unit 6 while being discharged via the paper discharge port 44.

The printing unit 6 has a thermal head 61 and a platen roller 62. The thermal head 61 has a plurality of resistors arranged in a line along the width direction of the paper 50. The resistor is supplied with power (electrified) to generate heat and therefore is also referred to as a heat generation element or heater element in some instances. As these resistors arranged in a line can be selectively electrified, printing is performed on the paper 50 row by row. The platen roller 62 supports a printing position on the paper 50 (a part held between the platen roller 62 and the thermal head 61).

The conveyor unit 7 is formed by a motor 71 and the platen roller 62. The motor 71 drives and rotates the platen roller 62. The platen roller 62 rotates and thus conveys (advances) the paper 50 that is held between the thermal head 61 and the platen roller 62.

The AC adaptor 2 is a power supply that feeds power to the thermal head 61 and the motor 71.

Figure 3:
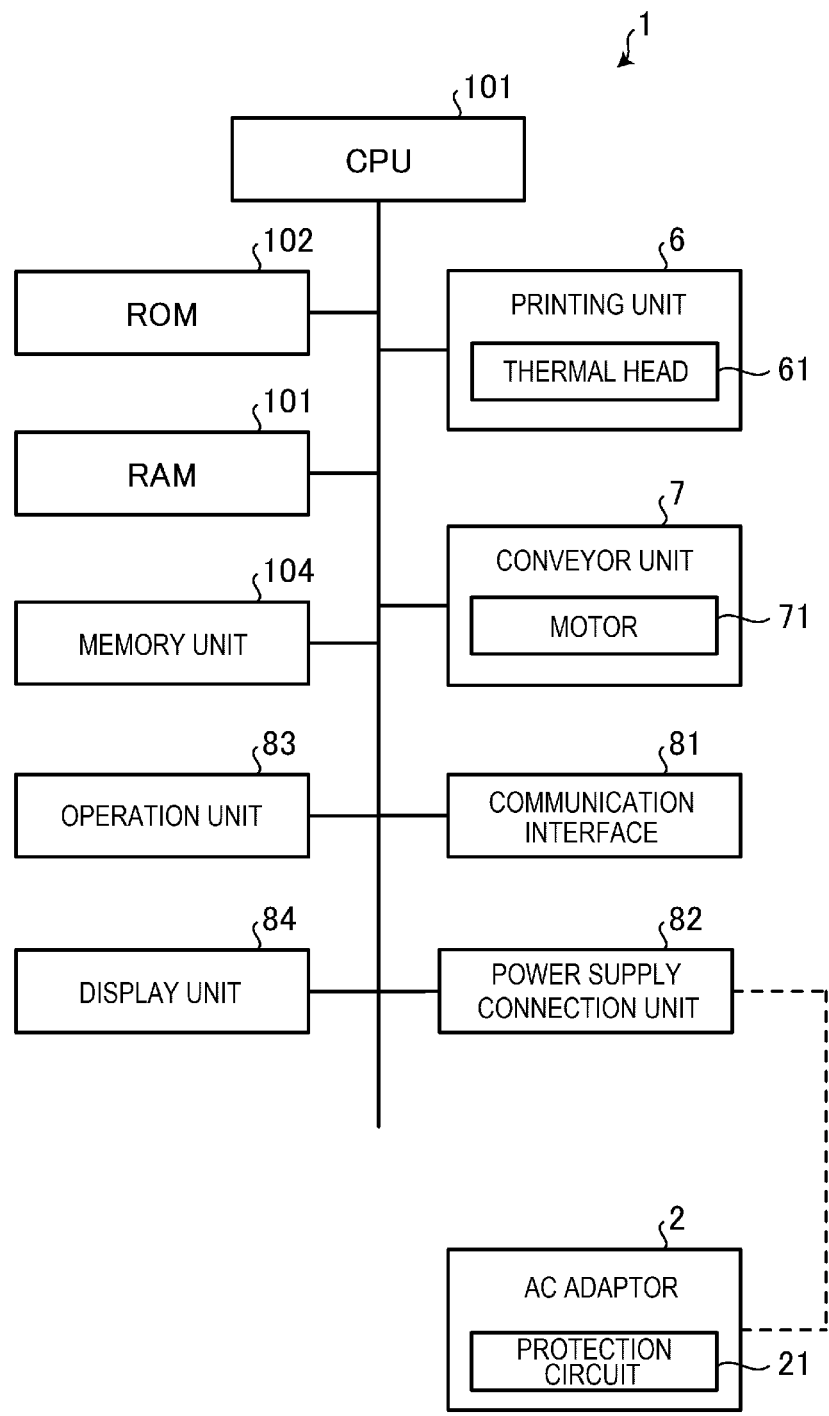
FIG. 3 is a block diagram explaining an example of the configuration of a printer.

FIG. 3 is a block diagram showing an example of the configuration of the printer 1. The printer 1 has a CPU 101 (central processing unit), a ROM 102 (read-only memory), a RAM 103 (random-access memory), a memory unit 104

(e.g., a storage device), a communication interface 81, a power supply connection unit 82, an operation unit 83, a display unit 84, and the like.

The power supply connection unit 82 is a part to which the AC adaptor 2 is connected. The power supply connection unit 82 receives a supply of power from the AC adaptor 2. The AC adaptor 2 has a protection circuit 21. The protection circuit 21 stops feeding power in response to the occurrence of a predetermined triggering phenomenon to avoid overloading of the AC adaptor 2. The predetermined trigger phenomenon may include two separate phenomena in this instance. One case (a first trigger) is that a duration of power feeding exceeds some threshold duration value (referred to as a second threshold) after power feeding by the AC adaptor exceeds a threshold power value (referred to as a first threshold). The other case (a second trigger) is that the total amount of power fed within some unit time by the AC adaptor 2 exceeds a threshold value (referred to as a third threshold).

The first threshold in this embodiment defines a peak current, for example, 13 A (amperes). The second threshold in this embodiment is, for example, a time period of 10 seconds. The third threshold in this embodiment is the rated power of the power supply, for example, 60 W (watts).

The communication interface 81 mediates communication with an external device (such as information processing device 3). The operation unit 83 is user input device such as a button and accepts an input operation from an operator. The display unit 84 is a display device such as a liquid crystal panel and displays information to the operator/user.

The memory unit 104 stores a program, various files, various set values, and the like. The memory unit 104 may be a memory storage device and can be implemented, for example, as a flash memory or the like. The program stored in the memory unit 104 is executed by the CPU 101. The memory unit 104 stores parameters such as constants, threshold settings, and the like used by the program, which will be described further using FIGS. 5 and 6.

The ROM 102 stores a program to be executed by the CPU 101. The RAM 103 is used for loading the program to be executed by the CPU 101 and for temporarily storing various variable values. The CPU 101 executes the programs stored in the ROM 102 and the memory unit 104 and thus functions as a control unit 110 and implements thereby in this example various functional units shown in FIG. 4.

Figure 4:
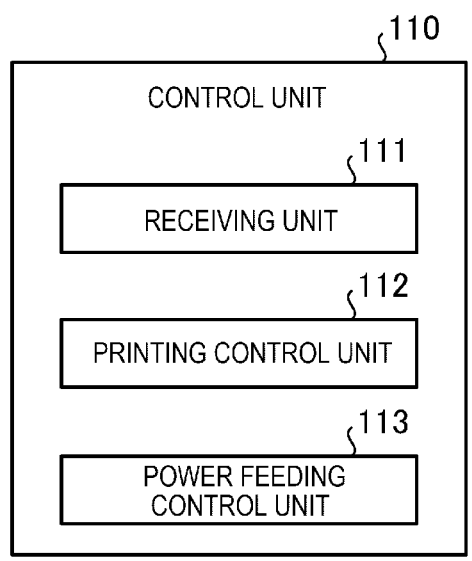
FIG. 4 is a block diagram showing an example of functional units provided in a control unit.

FIG. 4 is a block diagram showing an example of the functional units provided in the control unit 110. The control unit 110 functions as a receiving unit 111, a printing control unit 112, and a power feeding control unit 113.

The receiving unit 111 receives printing data from the information processing device 3. The printing control unit 112 controls the thermal head 61 and the motor 71 based on the printing data.

The power feeding control unit 113 stops feeding power to the motor 71 and the thermal head 61 and resumes feeding power after the lapse of a predetermined time (for example, 500 μs) if the first trigger occurs, that is, if the duration of power feeding exceeds the second threshold (for example, 10 seconds) after the AC adaptor 2 executes power feeding that exceeds the first threshold (for example, 13 A).

Also, the power feeding control unit 113 stops feeding power to the motor 71 and the thermal head 61 and resumes feeding power after the lapse of a predetermined time (for example, 500 μs) if the second trigger occurs, that is, if the total amount of power fed within a unit time (for example, 10 seconds) by the AC adaptor 2 exceeds the third threshold (for example, 60 W).

The power feeding control unit 113 clears the value indicating the total amount of power fed at the stop of the power feeding by the AC adaptor 2. Stopping the power feeding in this case is not limited to stopping the printing and conveyance under the control of the power feeding control unit 113 and may also be stopping due to the completion of a printing operation based on printing data, or the like. That is, the power feeding control unit 113 clears the value indicating the total amount of power fed upon the stopping of the printing and conveyance due to any factor. Clearing the value in this context means, for example, resetting a variable value used to accumulate (track) the value indicating the total amount of power fed in a control program or the like to zero. The value indicating the total amount of power fed may be not the actual total amount of power fed itself but rather may be a value correlated with the total amount of power fed such as a value proportional to the total amount of power fed or some values by which the total amount of power fed may be calculated.

Figure 5:
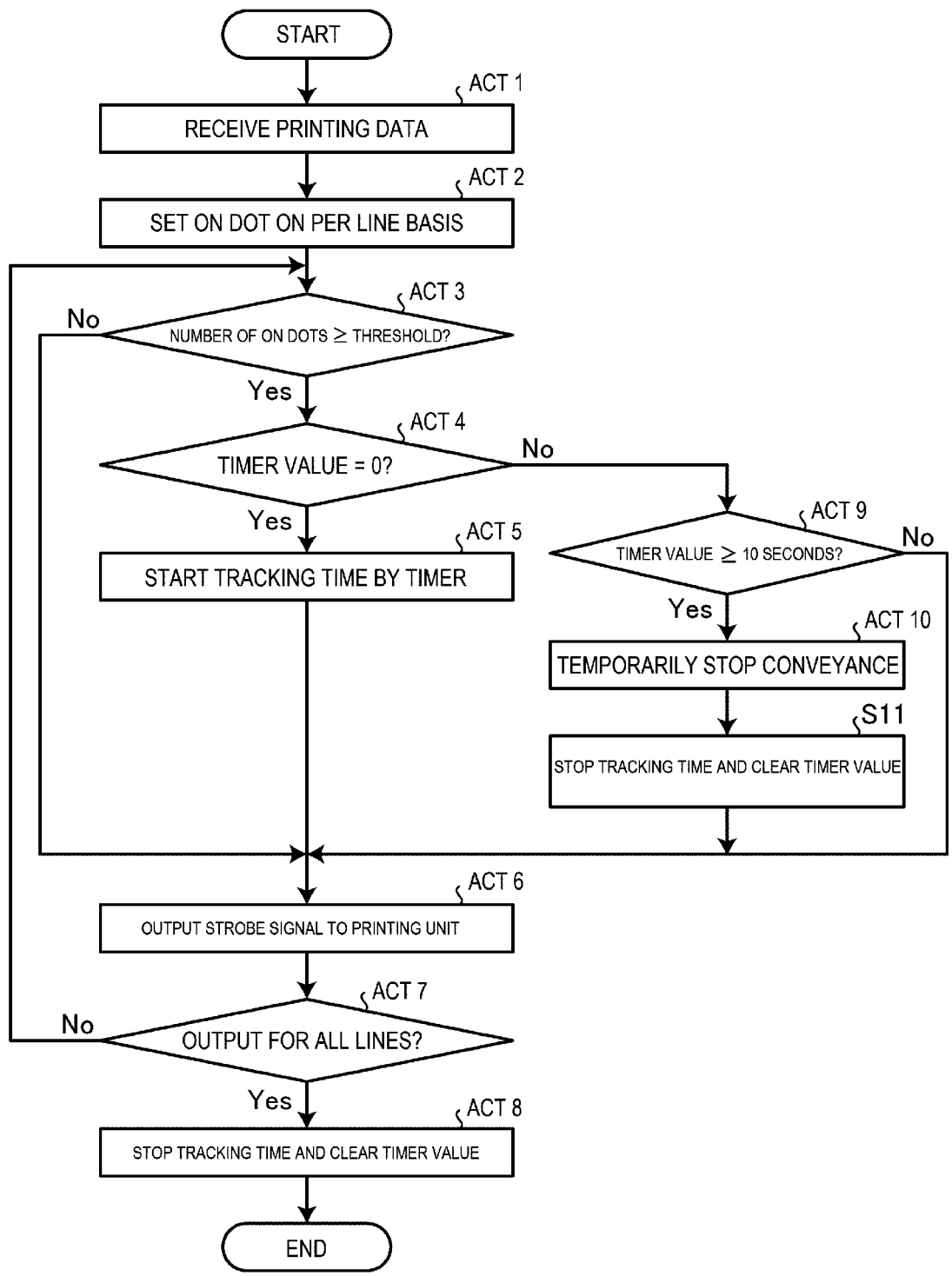
FIG. 5 explains a flow of processing executed by a control unit.

FIG. 5 explains a flow of processing executed by the control unit 110. This processing relates to handling of the first trigger.

When the receiving unit 111 receives printing data (ACT 1), the control unit 110 causes the printing control unit 112 to set an ON dot on a per line basis based on the printing data (ACT 2). In this context, an ON dot is a resistor to be electrified in accordance with printing of the printing data.

Next, the control unit 110, functioning as the power feeding control unit 113, determines whether or not the number of ON dots for each line is greater than or equal to a threshold (ACT 3). This threshold is, for example, a number of dots in one line that would cause the exceeding of the peak current of 13 A (an example of the first threshold).

If it is determined that the number of ON dots for each line to be printed is less than the threshold (NO in ACT 3), the power feeding control unit 113 shifts the processing to ACT 6. If it is determined in ACT 3 that the number of ON dots for a line meets or exceeds the threshold (YES in ACT 3), the power feeding control unit 113 determines whether a timer value indicating the time elapsed since the number of ON dots was equal to or greater than the threshold is 0 or not (ACT 4).

If the timer value is 0 (YES in ACT 4), the power feeding control unit 113 starts tracking time using a timer (ACT 5) and proceeds to ACT 6. The time tracking by the timer can be implemented, for example, using a time tracking function such as an RTC (real-time clock) provided in the printer 1.

If the timer value is not 0 in ACT 4 (NO in ACT 4), the power feeding control unit 113 next determines whether or not the timer value is equal to or greater than 10 seconds, which is an example of the second threshold (ACT 9). If the timer value is equal to or greater than 10 seconds (YES in ACT 9), the power feeding control unit 113 cooperates with the printing control unit 112 to stop the conveyance by the conveyor unit 7 temporarily (for example, for a time period of 500 μs) (ACT 10).

Thus, the control unit 110 can briefly stop feeding power before the protection circuit 21 stops feeding power as a result of an overload trigger or the like. Therefore, a stop of power feeding that is unexpected to the control unit 110 can be avoided. Thus, smooth printing control can be continued and high printing accuracy can be maintained.

After ACT 10, the power feeding control unit 113 stops tracking time with the timer and clears the timer value (ACT 11) and proceeds to ACT 6. If the timer value is less than 10 seconds in ACT 9 (NO in ACT 9), the power feeding control unit 113 proceeds to ACT 6 while continuing to track time with the timer.

In ACT 6, the printing control unit 112 generates a strobe signal corresponding to one line of print data based on the content of the setting in ACT 2, and outputs the strobe signal to the printing unit 6 to print the one line (ACT 6).

In ACT 6, the control unit 110 feeds power to the conveyor unit 7 (more specifically, motor 71) as well as the printing unit 6 (more specifically, thermal head 61) and rotates the platen roller 62 by an amount corresponding to the movement of paper S by one line.

Subsequently, the printing control unit 112 determines whether the output for all the lines has been completed or not (ACT 7). If it is determined that the output for all the lines is not yet complete (NO in ACT 7), the printing control unit 112 returns the processing to ACT 3. If it is determined that the output for all the lines is complete (YES in ACT 7), the power feeding control unit 113 stops tracking time with the timer and clears the timer value (ACT 8) and ends this processing.

According to FIG. 5, if a phenomenon that may cause the function of the power supply to temporarily stop feeding power occurs, the printer 1 temporarily stops feeding power under its own control before the functioning of the power supply 2 (more specifically, protection circuit 21) stops feeding power. Thus, the occurrence of a temporary stop of power feeding by the function of the power supply 2 can be avoided. Also, adverse effects on printing control and printing accuracy related to a stop of power feeding by the power supply 2 for which the printer 1 is not prepared for can be eliminated. The printer 1 stops or limits feeding of power in a planned way and therefore can continue smooth printing control and maintain high printing accuracy.

Figure 6:
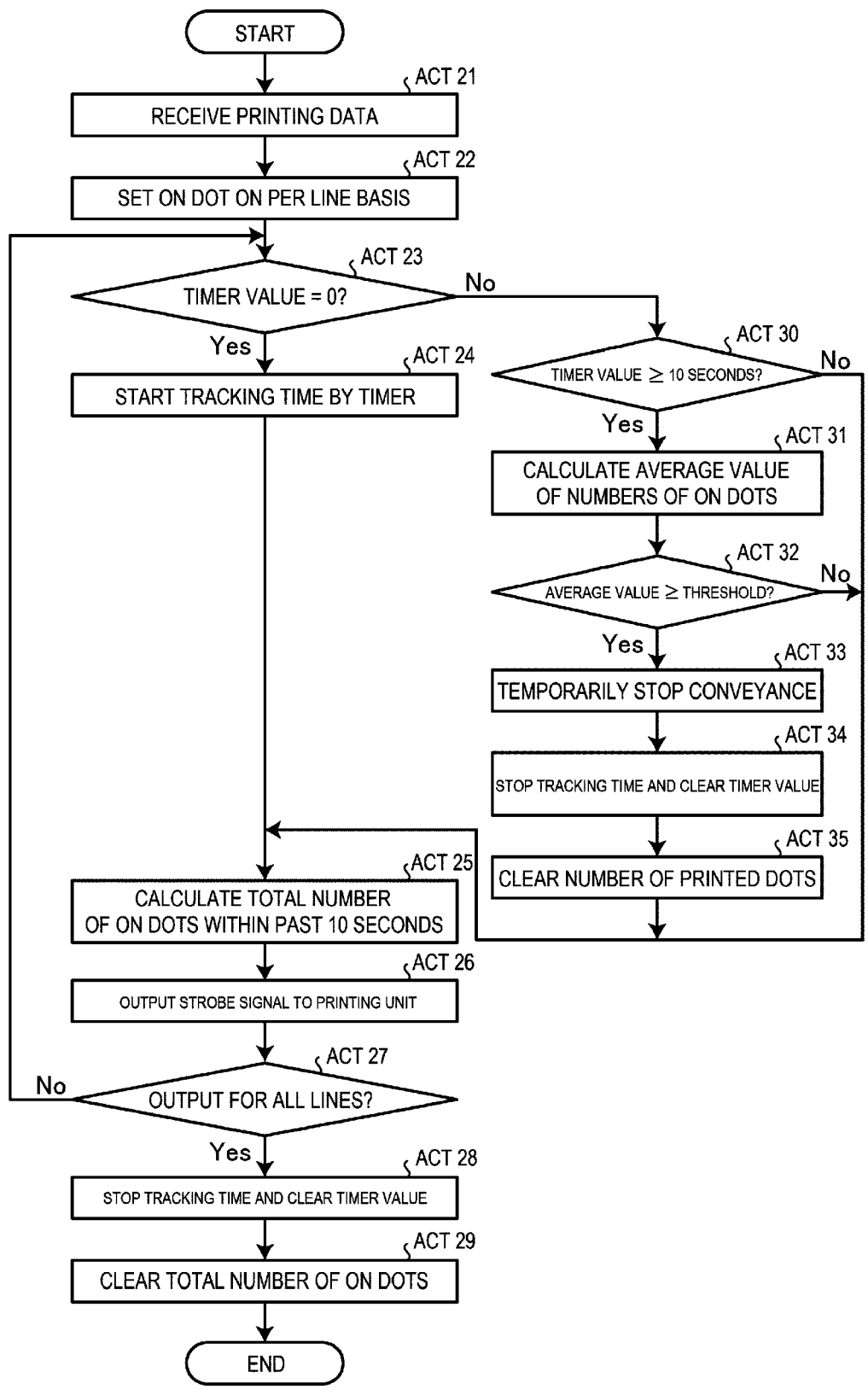
FIG. 6 explains another flow of processing executed by a control unit.

FIG. 6 explains another flow of processing executed by the control unit 110. This processing is configured to cope with a phenomenon serving as the second trigger. The control unit 110 in this embodiment executes both the processing shown in FIG. 5 and the processing shown in FIG. 6. However, in other examples, the control unit 110 may execute just one of the processing shown in FIG. 5 or the processing shown in FIG. 6.

When the receiving unit 111 receives printing data (ACT 21), the control unit 110 causes the printing control unit 112 to set an ON dot on a per line basis based on the printing data (ACT 22).

The power feeding control unit 113 next determines whether a timer value indicating the time elapsed since the initial reception of the printing data and the setting of the ON dot is 0 or not (ACT 23). The timer in this processing shown in FIG. 6 can be different or kept separately from the timer discussed in relation to the processing shown in FIG. 5.

If the timer value is 0 in ACT 23 (YES in ACT 23), the power feeding control unit 113 starts tracking time by the timer (ACT 24) and proceeds to ACT 25.

In ACT 25, the power feeding control unit 113 calculates the total number of ON dots utilized within the past 10 seconds, that is, the sum of the numbers of resistors that have been electrified for printing within the past 10 seconds (ACT 25). The "10 seconds" described in ACT 25 is an example of a "unit time" and other times may be adopted as appropriate.

Subsequently, in ACT 26, the printing control unit 112 generates a strobe signal corresponding to one line, based on the content of the setting in ACT 22, and outputs the strobe signal to the printing unit 6 to print one line (ACT 26).

In ACT 26, the control unit 110 feeds power to the conveyor unit 7 (more specifically, motor 71) as well as the printing unit 6 (more specifically, thermal head 61) and rotates the platen roller 62 by an amount corresponding to the conveyance of the paper S by one line.

Subsequently, the printing control unit 112 determines whether the output for all the lines has been complete or not (ACT 27). If it is determined that the output for all the lines is not yet complete (NO in ACT 27), the printing control unit 112 returns the processing to ACT 23. If it is determined that the output for all the lines is completed (YES in ACT 27), the power feeding control unit 113 stops tracking time with the timer and clears the timer value (ACT 28) and also clears the total number of ON dots (ACT 29) and then ends this processing.

If the timer value is not 0 in ACT 23 (NO in ACT 23), the power feeding control unit 113 determines whether or not the timer value is equal to or greater than 10 seconds (or the set unit time value) (ACT 30). If the timer value is less than 10 seconds in ACT 30 (NO in ACT 30), the power feeding control unit 113 proceeds to ACT 25 while continuing to track time using the timer.

If the timer value is equal to or greater than 10 seconds in ACT 30 (YES in ACT 30), the power feeding control unit 113 calculates the average value of the numbers of ON dots (ACT 31). In this context, the average value of the numbers of ON dots is calculated by dividing the total number of ON dots calculated in ACT 25 by the total number of lines printed within the past 10 seconds.

Next, the power feeding control unit 113 determines whether the average value calculated in ACT 31 is equal to or greater than some threshold value (ACT 32). This threshold value is, for example, the number of dots printed within the unit time (e.g., 10 seconds) for which the total amount of power fed by the AC adaptor 2 will exceed 60 W, which is an example of the third threshold.

If the average value is equal to or greater than this threshold (third threshold) in ACT 32 (YES in ACT 32), the power feeding control unit 113 cooperates with the printing control unit 112 to stop the conveyance by the conveyor unit 7 temporarily (for example, for 500 μs) (ACT 33).

Thus, the control unit 110 can temporarily stop feeding power before the protection circuit 21 stops feeding power after a predetermined phenomenon occurs. Therefore, a stop of power feeding that is unexpected to the control unit 110 can be avoided. Thus, smooth printing control can be continued and high printing accuracy can be maintained.

After ACT 33, the power feeding control unit 113 stops tracking time with the timer and clears the timer value (ACT 34). The power feeding control unit 113 also clears the number of printed dots (the ON dots set in ACT 22), so that these already printed dots are not included again in the calculation in ACT 25 (ACT 35). The power feeding control unit 113 then proceeds to ACT 25.

In this way, the printer 1 according to this embodiment can prevent the stop of power feeding by the protection circuit 21 of the AC adaptor 2 if phenomena serving as the first trigger or the second triggers occur. That is, if printing continues even after power feeding that exceeds the peak current or if the total amount of power fed within the unit time exceeds the rated power, the printer 1 temporarily stops the conveyance and printing under the control of the control unit 110 before the protection circuit 21 starts to operate. Thus, the printer 1 can stop feeding power in a planned way.

In this embodiment, both the control shown in FIG. 5 and the control shown in FIG. 6 are executed. However, in other examples, just one (either one) of the control shown in FIG. 5 and the control shown in FIG. 6 may be executed instead of both.

The program executed in the printer 1 according to this embodiment can be incorporated in the ROM or the like in advance and provided to an end user in this form.

The program executed in the printer 1 according to this embodiment may otherwise be provided as a file in an installable format or an executable format recorded in a non-transitory computer-readable recording medium such as a CD-ROM, a flexible disk (FD), a CD-R, or a DVD (digital versatile disk).

The program executed in the printer 1 according to this embodiment may also be stored in a computer connected to a network such as the internet and may be downloaded via the network and thus provided to a user. The program executed in the printer 1 according to this embodiment may also be provided or distributed via a network such as the internet.

The program executed in the printer 1 according to this embodiment has a modular configuration providing the described functions of the receiving unit 111, the printing control unit 112, and the power feeding control unit 113). The CPU 101 (processor) reads out the program from the storage medium and executes the program, and thus implements the foregoing units in the main memory of the device or the like. Thus, the receiving unit 111, the printing control unit 112, and the power feeding control unit 113 are generated as functional units in the main memory or the like.

While certain embodiments have been described, these embodiments are presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:
   a thermal printhead including resistive heating elements;
   a motor for conveying paper to the thermal printhead;
   a power supply configured to supply power to the thermal printhead and the motor; and
   a processor configured to cause the supply of power to the motor to be paused if the supply of power to the thermal printhead exceeds a power threshold value and then to resume the supply of power to the motor after a predetermined period of time elapses after the pause of the supply of power to the motor, wherein
   the power threshold value is based on a number of energized resistive heating elements per a line of print data supplied to the thermal printhead for printing.

2. The printer according to claim 1, wherein the power threshold value is the number of energized resistive heating elements in a single line of print data.

3. The printer according to claim 1, wherein the power threshold value is an average number of energized resistive heating elements per line of print data over a predetermined time period during a printing operation.

4. The printer according to claim 1, further comprising:
   a platen roller facing the thermal print head, wherein
   the motor is configured to drive the platen roller to convey paper to the thermal printhead from a roll of paper.

5. The printer according to claim 1, wherein the power threshold value is a number of consecutive lines of print data with the number of energized resistive heating elements above a threshold number of energized resistive heating elements.

6. A printer, comprising:
   a thermal printhead including a plurality of resistive heating elements in a line;
   a platen roller facing the thermal printhead;
   a motor configured to drive the platen roller and convey paper to the thermal printhead by rotation of the platen roller;
   a power supply configured to supply power to the thermal printhead and the motor; and
   a control unit configured to control the supply of power to the resistive heating elements and the motor, the control unit causing the supply of power to the motor to be paused after the supply of power to the thermal printhead exceeds a power threshold value and then to resume the supply of power to the motor after a predetermined period of time elapses after the pause of the supply of power to the motor, wherein
   the power threshold value is based on a number of energized resistive heating elements per a line of print data supplied to the thermal printhead for printing.

7. The printer according to claim 6, wherein the power threshold value is the number of energized resistive heating elements in a single line of print data.

8. The printer according to claim 1, wherein
   the power supply includes a protection circuit configured to stop the supplying of power from the power supply when either a power supply level exceeds a threshold level or a duration of continuous supplying of power exceeds a threshold time, and
   the processor causes the supply of power to the motor to be paused independently of the protection circuit operations.

9. The printer according to claim 6, wherein the power threshold value is an average number of energized resistive heating elements per line of print data over a predetermined time period during a printing operation.

10. The printer according to claim 6, wherein the paper is supplied to the thermal printhead from a roll of paper.

11. The printer according to claim 6, wherein the power threshold value is a number of consecutive lines of print data with the number of energized resistive heating elements above a threshold number of energized resistive heating elements.

12. The printer according to claim 6, wherein the pause is 500 microseconds or less.

13. The printer according to claim 6, wherein the control unit is a central processing unit executing a control program.

14. The printer according to claim 6, wherein
   the power supply includes a protection circuit configured to stop the supplying of power from the power supply when either a power supply level exceeds a threshold level or a duration of continuous supplying of power exceeds a threshold time, and
   the control unit causes the supply of power to the motor to be paused independently of the protection circuit operations.

15. A control method for a printer including a thermal printhead and a motor, the control method comprising:
   cause the supply of power to the motor to be paused after the supply of power to the thermal printhead exceeds a power threshold value and then to resume the supply of power to the motor after a predetermined period of time elapses after the pause of the supply of power to the motor, wherein the power threshold value is based on a number of energized resistive heating elements per a line of print data supplied to the thermal printhead for printing.

16. The control method according to claim 15, wherein the power threshold value is the number of energized resistive heating elements in a single line of print data.

17. The control method according to claim 15, wherein the power threshold value is an average number of energized resistive heating elements per line of print data over a predetermined time period during a printing operation.

18. The control method according to claim 15, further comprising:

driving the motor to supply paper to the thermal printhead.

19. The control method according to claim 15, wherein the paper is supplied to the thermal printhead from a roll of paper.

20. The control method according to claim 15, wherein the power threshold value is a number of consecutive lines of print data with the number of energized resistive heating elements above a threshold number of energized resistive heating elements.

* * * * *